United States Patent
Shibata

(10) Patent No.: US 6,973,856 B2
(45) Date of Patent: Dec. 13, 2005

(54) SCREW TIGHTENING APPARATUS

(75) Inventor: Hidetaka Shibata, Aichi (JP)

(73) Assignee: Okuma Corporation, Niwa-gun (JP)

( * ) Notice: Subject to any disclaimer, the term of this patent is extended or adjusted under 35 U.S.C. 154(b) by 0 days.

(21) Appl. No.: 10/418,963

(22) Filed: Apr. 18, 2003

(65) Prior Publication Data
US 2004/0052629 A1 Mar. 18, 2004

(30) Foreign Application Priority Data
Apr. 25, 2002 (JP) .......................... 2002-124787

(51) Int. Cl.[7] .......................................... B25B 21/00
(52) U.S. Cl. ............................................... 81/57.4
(58) Field of Search .......................................... 81/57.4

(56) References Cited

U.S. PATENT DOCUMENTS 4,887,016 A * 12/1989 Malick ....................... 700/254
5,104,024 A * 4/1992 Brewer et al. ................... 227/2
5,332,181 A * 7/1994 Schweizer et al. ........ 248/123.11
5,415,057 A * 5/1995 Nihei et al. ............... 74/490.01

* cited by examiner

Primary Examiner—Debra S. Meislin
(74) Attorney, Agent, or Firm—Burr & Brown

(57) ABSTRACT

In order to provide a space-saving inexpensive screw tightening apparatus by forming the same apparatus as a whole to a rational simple construction, a screw tightening apparatus M is provided with a robot 5 for retaining a nut runner 1, which is adapted to tighten a recess bolt 8, with respect to a work 10, and support members 2, 3, 4 for supporting the nut runner 1 so that the nut runner 1 can be displaced in three axes which orthogonally cross one another. An air cylinder bearing the weight of the nut runner 1 or support members 2, 3, 4 are connected to the support member 2.

4 Claims, 2 Drawing Sheets

SCREW TIGHTENING APPARATUS

BACKGROUND OF THE INVENTION

This application claims the benefit of Japanese Patent Application Number 2002-124787 filed on Apr. 25, 2002, the entirety of which is incorporated by reference.

1. Field of the Invention

The present invention relates to a screw tightening apparatus for tightening screws such as a bolt and a nut to a work.

2. Description of the Related Art

As an apparatus for automatically tightening screws, an apparatus having a nut runner provided on a free end portion or an arm of an articulated robot is known. The nut runner is usually provided with a driving motor, and a bit portion fixedly mounted on a driving shaft of the driving motor. When the driving motor is rotated with a bolt and a nut fitted around the bit portion, the tightening of the bolt and the like is done at a high speed with ease.

In such a conventional screw tightening apparatus, the robot supporting the nut runner receives via the nut runner a working force (reaction force) with respect to the tightening of a bolt and the like. Therefore, an arm has to be of a high rigidity so that even a free end portion of the arm can withstand the reaction force. As a result, the use of such a large-sized robot becomes necessary. The use of such a robot requires a large space, and costs much.

SUMMARY OF THE INVENTION

The object of the present invention is to provide a space-saving and inexpensive screw tightening apparatus, by providing a rational and simple construction as a whole.

In order to achieve this object of the present invention, according to a first aspect of the present invention, a screw tightening apparatus is provided which includes a robot adapted to retain a screw tightening nut runner, and a support mechanism adapted to support the nut runner so that the nut runner can be displaced in three axial directions which orthogonally cross one another.

In order to achieve another object of the present invention of providing a space-saving inexpensive screw tightening apparatus in addition to the above mentioned object, a second aspect of the present invention includes a screw tightening apparatus which has a balancer mechanism adapted to support the weight of the nut runner or support mechanism and connected to the support mechanism.

DESCRIPTION OF THE REFERENCE SYMBOLS

M . . . SCREW TIGHTENING APPARATUS, 1 . . . NUT RUNNER, 1c . . . BASE PORTION, 2, 3, 4 . . . SUPPORT MEMBERS, 5 . . . ROBOT, 5b . . . FRAME, 6 . . . CLAMP PORTION, 7 . . . BIT PORTION, 10 . . . WORK.

DESCRIPTION OF THE PREFERRED EMBODIMENTS

A mode of embodiment of the present invention will now be described on the basis of the drawings.

Figure 1:
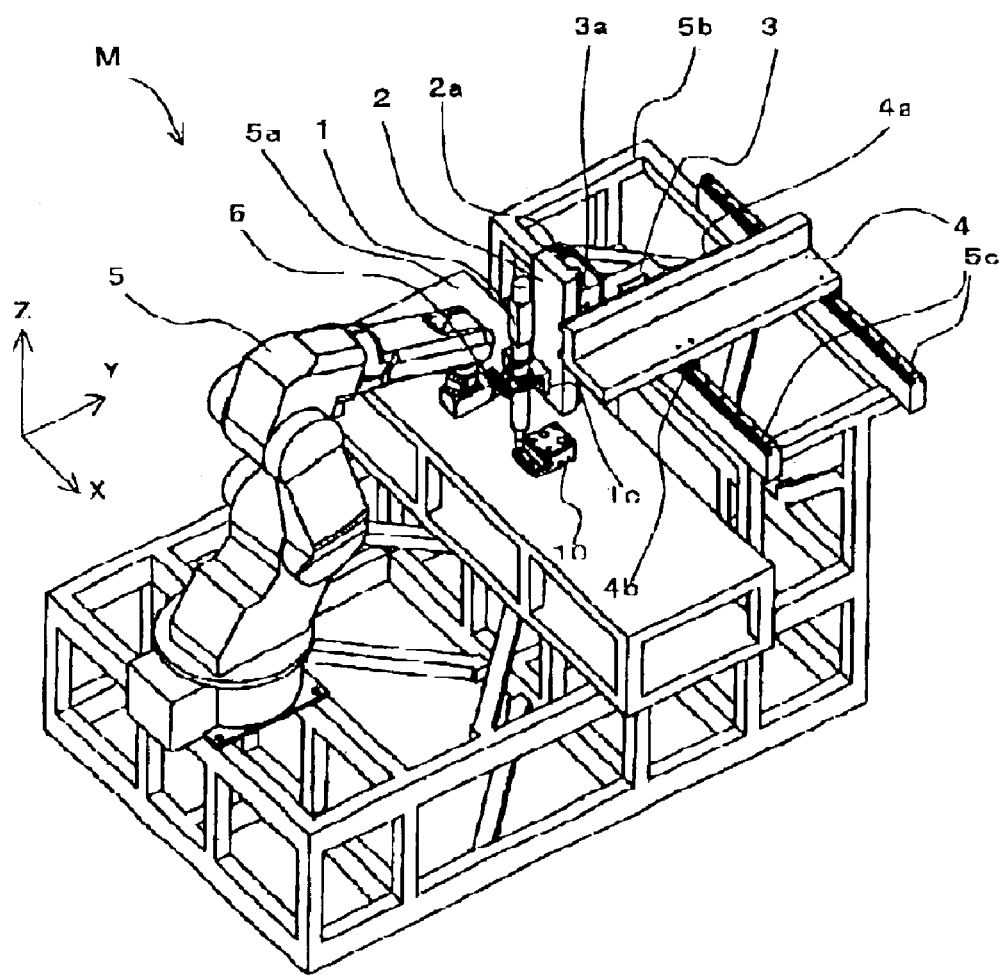
FIG. 1 shows a perspective explanatory drawing of the screw tightening apparatus according to the present invention.

FIG. 1 is an outlined drawing of the screw tightening apparatus according to the present invention, in which a screw tightening apparatus M includes a nut runner 1, support members 2, 3, 4 which constitute a support mechanism, and a small-sized robot 5, a worktable 5a, and a frame 5b for supporting these parts. In FIG. 1, an X-axis, a Y-axis and a Z-axis represent a lateral direction, a longitudinal direction and a vertical direction respectively of the robot 5. These three axes orthogonally cross one another, among which the X-axis and Y-axis are horizontal, and among which the Z-axis is vertical. In each of these axes, right, front and upper sides shall be positive sides.

Figure 2:
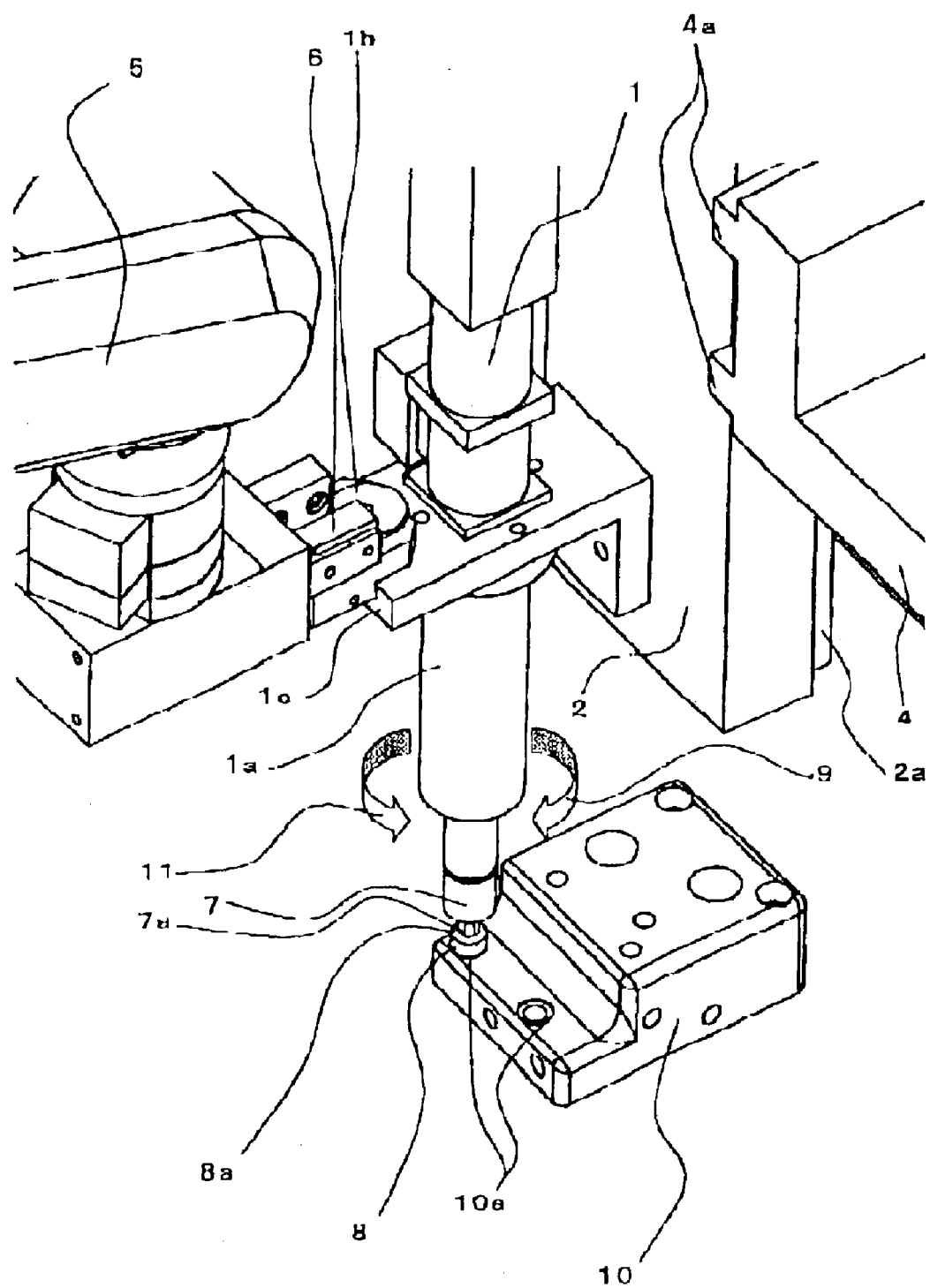
FIG. 2 shows an enlarged strabismus view of parts close to a nut runner in the screw tightening apparatus of FIG. 1.

FIG. 2 is an enlarged view of parts around the nut runner 1, which shows a clamp portion 6 provided on a front end of the robot 5 with the nut runner 1 held tightly thereby. The nut runner 1 includes a cylindrical portion 1a, a clamping member 1b to be clamped, and a base 1c for the clamping member to be clamped, and a bit portion 7 having a hexagonal column section 7a is provided firmly on a lower end side of the cylindrical portion 1a.

The hexagonal column section 7a of the bit portion 7 fits in a hexagonal hole 8a of a recess bolt 8 to be tightened. The bit portion 7 can be turned in the tightening direction 9 of the recess bolt 8. The recess bolt 8 can be disposed in a predetermined tightening hole 10a of a work 10 on the worktable 5a. The robot 5 has a multiplicity of joints, and is capable of positioning thereof independently in each axis with respect to the clamp portion 6.

The support member 2 is a plate type member provided so as to be opposed to the robot 5, in which the Y-axis constitutes a normal line. On the surface of the support member 2 which is on a positive side of the Y-axis, rails 2a are provided with respect to two grooves 3a extending in the Z-axis provided integrally with a support member 3. Since the rails 2a are fitted movably in the grooves 3a, the rails are connected to the support member 2 so that the rails 2a can be moved along the Z-axis. Furthermore, the base 1c for the nut runner 1 is fixed on the surface of the support member 2 which is on the positive side of the Y-axis.

The support member 3 is a cross-sectionally L-shaped block. On the surface in one portion which in on the negative side of the Y-axis, the support member 3 has the above-described grooves 3a. At the same time, on the surface of the positive side of the X-axis of the other portion which is positioned at the positive side of the Y-axis of the support member 3, there are grooves (not shown) which receive rails 4a of the support member 4 so that the rails 4a are movable in the grooves. In addition, the support member 4 is a similar block. On the surface in one portion which is on the negative side of X-axis, the support member 4 has two rails 4a which extend along the Y-axis. At the same time, at the lower side of the other portion, the support member 4 has two grooves 4b which receive one each or two rails 5c fixed along the X-axis in the frame 5b.

In a screw tightening operation in such a screw tightening apparatus M, the robot 5 controls the nut runner 1 via the clamp portion 6 in accordance with a command given by a control unit (not shown). First, the robot 5 receives in the nut runner 1 the supply of the recess bolt 8 for the bit portion 7. The robot 5 then inserts the recess bolt 8 at a free end of the bit portion 7 into a predetermined tightening hole 10a of the work 10, and positions the bolt 8 in the tightening hole 10a. During this time, the nut runner 1 drives the support members 2, 3, 4 to move along the X-axis, Y-axis and X-axis via the base 1c.

The control unit then drives the nut runner 1 so as to turn the same in the direction 9 in which the bit portion 7 is tightened. This causes the recess bolt 8 on the bit portion 7 is screwed into the tightening hole 10a of the work 10. During this time, the nut runner 1 receives a working force (reaction force) with respect to the tightening force in the direction 11 opposite to the tightening direction 9.

Consequently, the nut runner 1 withstands anti torque in the direction 11 opposite to that in which the tightening force is imparted. However, since the reaction force or anti torque is borne by the support members 2, 3, 4, and rails 5c or frame 5b, the robot 5 is not influenced by the reaction force or anti-torque, or receives the influence of the same in a restrained state.

When a screwing quantity or an anti-torque quantity reaches a predetermined level or the like, the control unit completes the screwing operation. The control unit repeats such an operation in a suitable manner, or further repeats the same operation by exchanging the work 10, and thereby carries out an automated screwing operation by the screw tightening apparatus M.

In such a screw tightening apparatus M, a reaction force or anti-torque occurring in the nut runner 1 due to a tightening operation is borne by the support members 2, 3, 4. Therefore, a robot of a comparatively low rigidity sufficiently serves the purpose. This enables a robot 5 formed to small dimensions and small capacity to be used satisfactorily in the screw tightening apparatus M. Further it enables the reduction of the manufacturing cost and the saving of a space to be attained.

Since the support members 2, 3, 4 are moved along the three orthogonally crossing axes, a mechanism for supporting the nut runner 1 can be simply formed without obstructing a movement thereof. Since the support members 2, 3, 4 are provided on each axis, a further simplified and rationalized structure can be obtained. Moreover, the support members 2, 3, 4 are provided so as to be opposed to the robot 5, so that these support members can be arranged simply in the condition in which the support members do not interfere with the nut runner 1 and robot 5.

Since the robot 5 is miniaturized, the frame 5b opposed thereto can also be miniaturized. Moreover this enables the further reduction of the manufacturing cost and the further saving of a space to be attained in the screw tightening apparatus M. Furthermore, when the support members 2, 3, 4 and the frame 5b therefor are added to the screw tightening apparatus M, it constitutes addition of elements, such as a moving block and a rod member, so that the manufacturing cost and an installation space do not increase much. The reduction of the manufacturing cost or an installation space due to the miniaturization of the robot 5 more than offsets the addition of the above-described elements.

The present invention is not limited to the above-described mode, and various modifications can be made as shown in the following examples.

In the above mode, an air cylinder as a balancer mechanism may further be connected to the support member 2. This air cylinder is provided on the frame 5b, and bears the weight of the nut runner 1 being moved or support members 2, 3, 4. Owing to such a balancer mechanism, the robot 5 can move the nut runner 1 or support members 2, 3, 4 in a substantially weightless state. As a result, a more inexpensive and more space-saving screw tightening apparatus having a further miniaturized robot 5 can be provided. The air cylinder may be connected to some other support member, or provided on some other portion, or provided plurally, or controlled by a control unit. Some other cylinder, a link mechanism and the like may also be provided instead of the air cylinder.

The support members may be formed to not block type members but to rod type members. The shape, dimensions and number of the rails or grooves can be varied in many ways, and the support members may be connected together by link mechanisms and the like. The support mechanism can be made so that this mechanism connects the support members on the three axes together in the order other than the above-described order from the nut runner to the frame. The support mechanism can also be made so that the mechanism is not an assembly of the support members on the axes but one or a plurality of movable support members on the three orthogonally crossing axes.

The robot can be formed to a robot adapted to clamp a nut runner directly, or to a robot fixed through a nut runner. In the nut runner, a clamp member may be omitted. The nut runner may be a nut runner adapted to receive a nut and screw the nut onto a bolt, or a nut runner in which some other screw is driven into a nut. The tightening direction can be set different from the above-described direction.

According to a first aspect of the present invention, a screw tightening apparatus includes a robot for retaining a screw tightening nut runners and a support mechanism for supporting the nut runner so that the nut runner can be displaced in three directions which orthogonally cross one another. This enables the nut runner to receive a reaction force imparted at the simple support mechanism. Further, it enables to miniaturize a comparatively expensive robot, form the screw tightening apparatus to a rational construction, and sufficiently reduce the manufacturing cost and an installation space.

According to a second aspect of the present invention, the balancer mechanism bearing the weight of the nut runner or support mechanism is connected to the support mechanism. This enables to hold down the influence of the support mechanism upon the robot. Moreover, this invention has such a rational construction as renders it possible to miniaturize the robot, and this enables the manufacturing cost and an installation space to be further reduced.

What is claimed is:

1. A screw tightening apparatus, comprising:
   a support member;
   a screw tightening nut runner supported by said support member, a base of said screw tightening nut runner having first and second opposing surfaces, wherein said first surface of said base being in contact with said support member; and
   a robot having a portion in contact with said second surface of said base of said screw tightening nut runner, said robot controlling said screw tightening runner.

2. A screw tightening apparatus according to claim 1, further comprising a frame member supporting each of said support member and said robot at different locations on said frame member.

3. A screw tightening apparatus according to claim 1, wherein said support member is a separate component spaced from said robot and bears anti-torque forces imposed upon the nut runner during screw tightening operations.

4. A screw tightening apparatus, comprising:
   a support member;
   a screw tightening nut runner;
   means for substantially independently supporting said screw tightening nut runner; and
   means for controlling said screw tightening nut runner, said means for controlling said screw tightening nut runner being independent from said support member and being releasably attached to a portion of said screw tightening nut runner.

* * * * *